United States Patent
Zhang

(10) Patent No.: US 10,222,513 B2
(45) Date of Patent: Mar. 5, 2019

(54) LENS

(71) Applicant: Haisheng Zhang, Shenzhen (CN)

(72) Inventor: Haisheng Zhang, Shenzhen (CN)

(73) Assignee: AAC TECHNOLOGIES PTE. LTD., Singapore (SG)

(*) Notice: Subject to any disclaimer, the term of this patent is extended or adjusted under 35 U.S.C. 154(b) by 11 days.

(21) Appl. No.: 15/417,143

(22) Filed: Jan. 26, 2017

(65) Prior Publication Data

US 2017/0343706 A1 Nov. 30, 2017

(30) Foreign Application Priority Data

May 27, 2016 (CN) .................... 2016 2 0499371 U

(51) Int. Cl.
*G02B 3/00* (2006.01)
*C03C 27/10* (2006.01)

(52) U.S. Cl.
CPC ............ *G02B 3/0012* (2013.01); *C03C 27/10* (2013.01)

(58) Field of Classification Search
CPC ......................... G02B 3/00–3/14; C03C 27/10
See application file for complete search history.

(56) References Cited

U.S. PATENT DOCUMENTS

| | | | |
|---|---|---|---|
| 6,515,800 B1* | 2/2003 | Border | G02B 3/005 349/95 |
| 7,969,656 B2* | 6/2011 | Yu | G02B 3/0062 359/622 |
| 9,625,684 B2* | 4/2017 | Norton | G02B 13/0085 |
| 2010/0177401 A1* | 7/2010 | Shiraishi | G02B 3/0062 359/622 |
| 2010/0284089 A1* | 11/2010 | Shyu | G02B 3/0062 359/622 |
| 2011/0063722 A1* | 3/2011 | Shyu | B29C 66/1122 359/355 |
| 2012/0188634 A1* | 7/2012 | Kubala | G02B 7/003 359/356 |
| 2012/0248637 A1* | 10/2012 | Chang | B29C 33/38 264/2.5 |

* cited by examiner

*Primary Examiner* — William R Alexander
*Assistant Examiner* — Jeffrey E Madonna
(74) *Attorney, Agent, or Firm* — Na Xu; IPro, PLLC

(57) ABSTRACT

The present disclosure provides a lens. The lens includes at least two layers of glass wafers, each glass wafer is provided with a lens array including a plurality of lens units, glue is provided around a periphery of each of the lens unit, the lens units of two adjacent layers of glass wafers are correspondingly arranged one to one, and are adhered via the glue, the glass wafer is further provided with an air hole. In the lens provided by the present disclosure, through providing an air hole on the glass wafer of the lens, so that when two adjacent glass wafers are stacked via the glue, air in the sealed space can be exhausted through the air hole, and through filling glue in the air hole of the outermost layer of glass wafer, the sealing effect is achieved, which can avoid packaging defects, and improve product yield.

6 Claims, 4 Drawing Sheets

LENS

TECHNICAL FIELD

The present disclosure relates to the field of shooting or photographing devices and, particularly, to a lens.

BACKGROUND

With the rapid development of electronic device industry, various types of electronic devices significantly make people's daily life more convenient. Moreover, people have stricter requirements on electronic products. Therefore, electronic device is developed to be smaller and thinner, so that manufacturing technique of the electronic device needs to be improved correspondingly, so as to overcome problems caused by structural defects of components during manufacturing process of electronic product.

As an important component of the electronic device, the quality of the lens directly determines the quality of the electronic device to which the lens is applied and thus affects user experience. The lens in the prior art, particularly the wafer-level glass lens, includes multiple layers of glass wafers and adhesive glue sandwiched between two adjacent layers of glass wafers, when the two adjacent layers of glass wafers are combined by stacking through the adhesive glue, a sealed space will be formed. However, the air inside the space will push the adhesive glue to move outward, resulting in that the shape of the adhesive glue is irregular, which frequently leads to packaging defects, that means the adhesive glue cannot seal completely, thereby reducing product yield of the lens.

Therefore, it is necessary to improve the lens in the prior art, so as to avoid the above defects.

DESCRIPTION OF EMBODIMENTS

The technical solutions in embodiments of the present disclosure will be described clearly and completely combining the drawings in the embodiments of the present disclosure. Obviously, the described embodiments are only a part of the embodiments of the present disclosure, but not all of them. Based on the embodiments in the present disclosure, all other embodiments obtained by those skilled in the art without creative work shall belong to the protection scope of the present disclosure.

Figure 1:
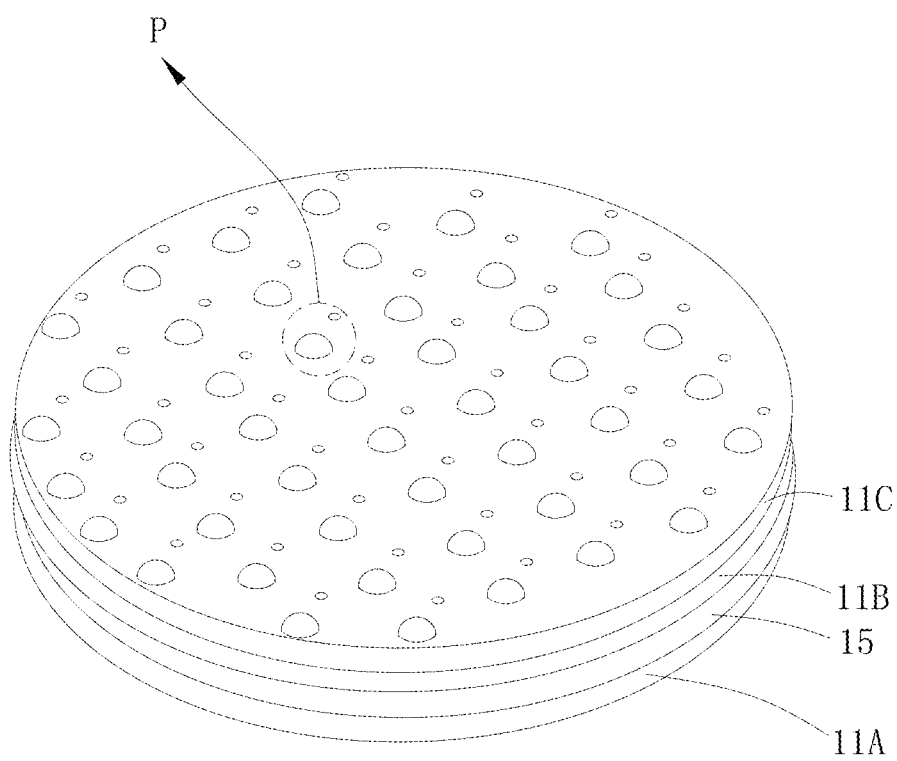
FIG. 1 is a perspective assembling schematic view of a lens provided by the present disclosure.
Figure 2:
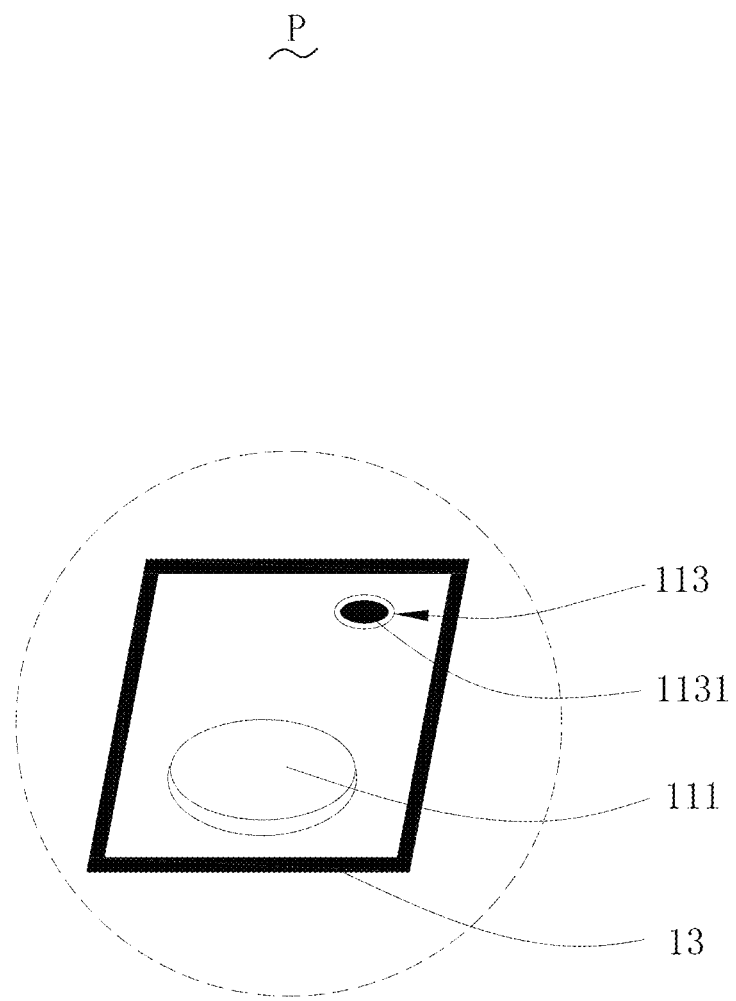
FIG. 2 is a partial enlarged view of an lens array of the lens shown in FIG. 1.
Figure 3:
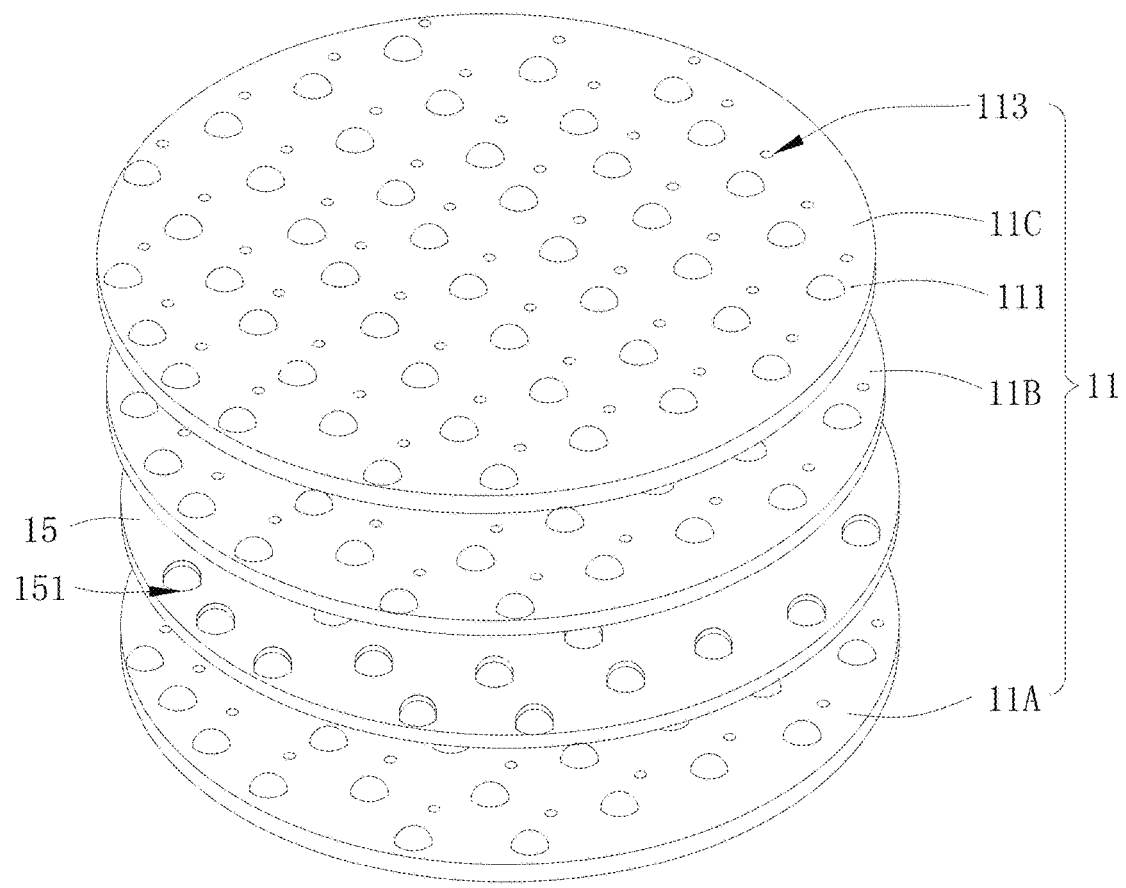
FIG. 3 is a perspective exploded schematic view of the lens shown in FIG. 1.
Figure 4:
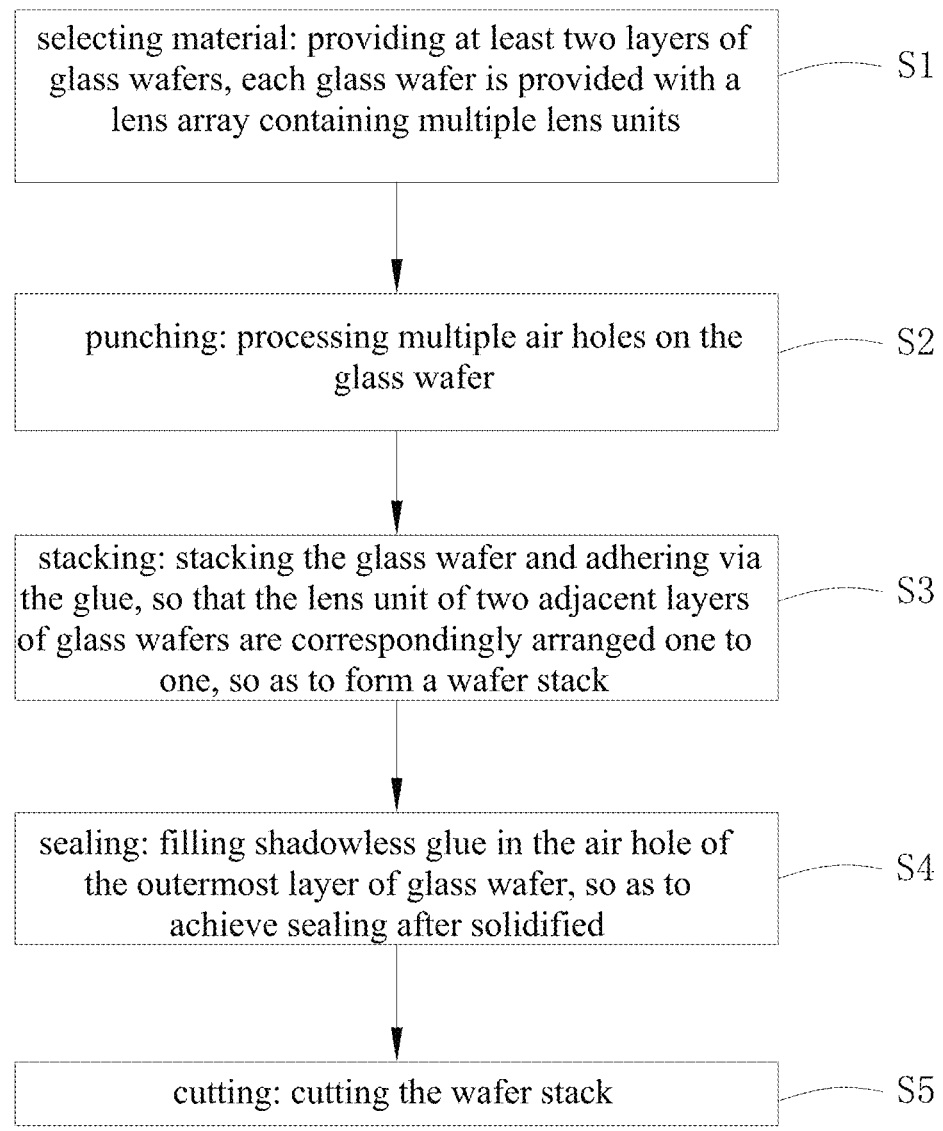
FIG. 4 is a flow chart showing steps when sealing the lens shown in FIG. 1.

Referring from FIG. 1 to FIG. 3, FIG. 1 is a perspective assembling schematic view of a lens provided by the present disclosure; FIG. 2 is a partial enlarged view of an lens array of the lens shown in FIG. 1; FIG. 3 is a perspective exploded schematic view of the lens shown in FIG. 1. The lens 1 includes at least two layers of glass wafers 11, each glass wafer 11 is provided a lens array P containing multiple lens units 111. Glue 13 is provided around a periphery of each of the lens unit 111. The lens units 111 of two adjacent layers of glass wafers 11 are correspondingly arranged one to one, and are adhered via the glue 13. In the present embodiment, in order to illustrate the present technical solution in detail, and make those skilled in the art clearly understand the technical solution, defining that the lens 1 includes three layers of glass wafers 11, which are respectively defined as a first layer of glass wafer 11A, a second layer of glass wafer 11B and a third layer of glass wafer 11C.

The first layer of glass wafer 11A and the second layer of glass wafer 11B are adhered via the glue 13, the second glass wafer piece 11B and the third layer of glass wafer 11C are also adhered via the glue 13. Further, the lens 1 also includes a spacer layer 15, the spacer layer 15 is sandwiched between the second layer of glass wafer 11B and the first layer of glass wafer 11A.

The first layer of glass wafer 11A, the second layer of glass wafer 11B and the third layer of glass wafer 11C have the same structure, which all include a lens array P containing multiple lens units 111, and multiple air holes 113. The air holes 113 are respectively provided close to the lens unit 111, and are located between two adjacent lens units 111. The air holes 113 of the first layer of glass wafer 11A, the second layer of glass wafer 11B and the third layer of glass wafer 11C are correspondingly arranged one to one and are communicated with each other. Shadowless glue 1131 used for sealing is filled in the air holes 113 of the first layer of glass wafer 11A and the third layer of glass wafer 11C. The air hole 113 is punched using available punching technique, such as laser punching, press punching or cut punching and so on. The lens unit 111 of the first layer of glass wafer 11A is a convex surface of the lens.

The glue 13 is used for adhering and solidifying two adjacent layers of glass wafers 11, that is, the second layer of glass wafer 11B and the third layer of glass wafer 11C are combined and solidified via the glue 13. The spacer layer 15 is adhered and solidified between the first layer of glass wafer 11A and the second layer of glass wafer 11B via the glue 13.

The spacer layer 15 is made of flexible resin spacer, including multiple spacer hole channels 151 arranged in array, the spacer hole channel 151 corresponds to the lens unit 111 of the adjacent first layer of glass wafer 11A one to one and accommodates the lens unit 111. The lens unit 111 is a convex surface of the lens. In other cases, the spacer layer 15 can also be made of plastic or glass material.

Please refer to FIG. 3, which is a perspective exploded schematic view of the lens shown in FIG. 1. When sealing the lens of the present disclosure, the following steps are included:

S1, selecting material: providing at least two layers of glass wafers 11, each glass wafer 11 is provided with a lens array P containing multiple lens units 111;

S2, punching: processing multiple air holes 113 on the glass wafer 11;

The air hole 113 is punched by available punching technique, such as laser punching, press punching or cut punching and so on.

S3, stacking: stacking the glass wafer 11 and adhering via the glue 13, so that the lens unit 111 of two adjacent layers of glass wafers 11 are correspondingly arranged one to one, so as to form a wafer stack;

In this step, due to the effect of the air hole 113, shape of the glue 13 is regular, so as to avoid the shape from being irregular or broken caused by escape of compressed air in the conventional processing technique. The step also includes calibrating, that is, using a high precision camera aligning system so as to make multiple layers of the glass wafers 11 be stacked.

S4, sealing: filling shadowless glue 1131 in the air hole 113 of the outermost layer of glass wafer 11, so as to achieve sealing after solidified.

S5, cutting: cutting the wafer stack.

The lens 1 provided by the present disclosure has the following beneficial effects: through providing air holes 113 on the glass wafer 11 of the lens 1, so as to exhaust air in the sealed space through the air hole 113 when two adjacent glass wafers 11 are stacked via the glue 13. Due to the effect of the air hole 113, the shadowless glue is regular, so as to avoid the shape from being irregular or broken caused by escape of compressed air occurred in conventional processing technique. Finally, through filling the air hole 113 of the outermost layer of glass wafer 11 with glue, that is, filling the shadowless glue 1131, the sealing can be achieved, so as to avoid packaging defect, thereby improving product yield.

The above are merely the preferred embodiments of the present disclosure, which will not limit the present disclosure, for those skilled in the art, the present disclosure can have various modifications and variations. Any modifications, equivalent replacements and improvements made within the spirits and principles of the present disclosure shall all fall in the protection scope of the present disclosure.

What is claimed is:

1. A lens, comprising;
at least two layers of glass wafers, each glass wafer is provided with a lens array comprising a plurality of lens units, glue is provided around a periphery of each of the lens units, the lens units of two adjacent layers of glass wafers are correspondingly arranged one to one, and are adhered via the glue, wherein each glass wafer is further provided with an air hole, the air hole is arranged close to the lens units for exhausting air in a sealed space through the air hole when two adjacent glass wafers stacked via the glue.

2. The lens as described in claim 1, further comprising a spacer layer, the spacer layer is arranged between two adjacent glass wafers.

3. The lens as described in claim 2, wherein the spacer layer is a flexible resin spacer, which comprises a plurality of spacer hole channels arranged in array, the spacer hole channel corresponds to the lens units of adjacent glass wafer one to one.

4. The lens as described in claim 1, wherein the air hole is further filled with shadowless glue used for sealing.

5. The lens as described in claim 1, wherein each lens unit corresponds to one air hole.

6. The lens as described in claim 1, wherein the air holes of two layers of glass wafers are correspondingly arranged one to one and are communicated with each other.

* * * * *